United States Patent
Aldridge

(10) Patent No.: US 10,259,291 B2
(45) Date of Patent: Apr. 16, 2019

(54) TEMPERATURE CONTROL SYSTEM FOR MACHINE AND METHOD OF OPERATING SAME

(71) Applicant: Caterpillar Inc., Peoria, IL (US)

(72) Inventor: Thomas Aldridge, Burnie (AU)

(73) Assignee: Caterpillar Inc., Deerfield, IL (US)

( * ) Notice: Subject to any disclaimer, the term of this patent is extended or adjusted under 35 U.S.C. 154(b) by 77 days.

(21) Appl. No.: 15/669,145

(22) Filed: Aug. 4, 2017

(65) Prior Publication Data

US 2019/0039439 A1 Feb. 7, 2019

(51) Int. Cl.
| | |
|---|---|
| *B60H 1/32* | (2006.01) |
| *B60L 11/18* | (2006.01) |
| *B60H 1/00* | (2006.01) |
| *H02K 9/19* | (2006.01) |
| *B60K 11/02* | (2006.01) |

(52) U.S. Cl.
CPC ......... *B60H 1/323* (2013.01); *B60H 1/00278* (2013.01); *B60H 1/00378* (2013.01); *B60L 11/1874* (2013.01); *B60L 11/1875* (2013.01); *H02K 9/19* (2013.01); *B60H 2001/00307* (2013.01); *B60K 11/02* (2013.01); *B60L 2200/40* (2013.01); *B60Y 2200/41* (2013.01); *B60Y 2200/91* (2013.01)

(58) Field of Classification Search
CPC ............... B60H 1/323; B60H 1/00899; B60H 1/00278; B60H 2001/00307; B60H 1/00378; H02K 9/19; B60L 11/1874; B60L 11/1875; B60L 2200/40; B60Y 2200/41; B60Y 2200/91; B60K 11/02; F25D 16/00; F25D 17/02
See application file for complete search history.

(56) References Cited

U.S. PATENT DOCUMENTS

| | | | | |
|---|---|---|---|---|
| 6,569,550 | B2 * | 5/2003 | Khelifa | B60H 1/143 429/434 |
| 8,336,319 | B2 | 12/2012 | Johnston et al. | |
| 2002/0040896 | A1 * | 4/2002 | Ap | B60K 1/04 219/208 |
| 2005/0133215 | A1 * | 6/2005 | Ziehr | B60H 1/00392 165/202 |
| 2007/0295489 | A1 * | 12/2007 | Tay | F24F 3/06 165/132 |
| 2010/0025006 | A1 * | 2/2010 | Zhou | B60H 1/00278 165/41 |

* cited by examiner

*Primary Examiner* — Emmanuel Duke
(74) *Attorney, Agent, or Firm* — Jonathan F. Yates

(57) ABSTRACT

A temperature control system includes cooling circuitry, refrigerant circuitry, and flow control circuitry. A valve mechanism in the flow control circuitry is adjustable between a closed state and an open state to transition the cooling circuitry between a series-flow configuration and a parallel-flow configuration, and to thermally decouple and thermally couple the cooling circuitry from the refrigerant circuitry.

20 Claims, 3 Drawing Sheets

TEMPERATURE CONTROL SYSTEM FOR MACHINE AND METHOD OF OPERATING SAME

TECHNICAL FIELD

The present disclosure relates generally to temperature control in a machine, and more particularly to a temperature control system having selectively connectable cooling, refrigerant, and flow control circuitry for exchanging heat with a plurality of thermal loads in a machine.

BACKGROUND

Temperature control technology has been developed for machinery since the dawn of the industrial era. Air cooling, liquid cooling, and more exotic techniques such as thermoelectric cooling have long been known and applied to machines such as engines, hydraulics, pneumatics, industrial processing machines, electronics, and all manner of other types of mechanical and electrical equipment. In addition to cooling, temperature control technology can be applied to increase temperatures of machinery and systems for various purposes. The operating conditions expected to be encountered, and in particular duty cycle and ambient environment, commonly drive the selection of appropriate temperature control techniques and equipment. Many persons will be familiar with radiators, water pumps, oil pumps, oil coolers, and other equipment used in connection with common machinery such as engines, automobiles, and even certain tools and electrical equipment.

In many instances, the temperature control requirements of a piece of equipment, for example an off-highway or underground mining machine, can vary substantially depending upon what part of the machine is of interest for temperature control. In some instances, an integrated cooling system that pumps a liquid coolant past multiple different thermal loads can sufficiently cool (or heat) the subject items without any necessity for independently controlling the temperature of each. By way of example, certain engine system designs are known where an internal combustion engine and an oil cooler for oil used in the engine or other parts of the machine are cooled by conveying a liquid coolant in series past the engine block as well as the engine oil cooler. A heat exchanger for heating an operator compartment can also be placed in the fluid series loop. While each separate thermal load may be sufficiently cooled, in some instances such techniques are not optimally efficient, as one or more of the thermal loads might be cooled further than it needs to be, or another cooled less than optimally.

U.S. Pat. No. 8,336,319 B2 to Johnston et al. is directed to a thermal management system with Dual Mode Coolant Loops. In Johnston et al., the system proposed includes a first coolant loop in thermal communication with a battery system, a second coolant loop in thermal communication with a drive train component, and a valve system that apparently enables a first mode where the coolant loops are in parallel and a second mode where the coolant loops are in series. While Johnston et al. may provide advantages for certain applications, there is ample room for improvement in the temperature control field.

SUMMARY OF THE INVENTION

In one aspect, a temperature control system for a machine includes cooling circuitry having a first coolant conduit for exchanging heat between a coolant conveyed through the cooling circuitry and a first thermal load, and a second coolant conduit for exchanging heat between the coolant and a second thermal load. The system further includes refrigerant circuitry having a refrigerant conduit, and an evaporative chiller fluidly connected with the refrigerant conduit. The system further includes flow control circuitry having a flow control conduit in heat transference contact with the evaporative chiller, the flow control conduit having an incoming segment and an outgoing segment each fluidly connected to both of the first coolant conduit and the second coolant conduit, and a valve mechanism. The valve mechanism is positioned fluidly between the incoming segment and the outgoing segment, and adjustable between a closed state at which the incoming segment is blocked from the outgoing segment such that the flow control circuitry connects the first coolant conduit and the second coolant conduit in series, and an open state at which the incoming segment is fluidly connected to the outgoing segment such that the flow control circuitry connects the first coolant conduit, the second coolant conduit, and the flow control conduit in parallel.

In another aspect, a machine includes a frame, and an electrical power system including a first electric power device and a second electric power device. The machine further includes a cooling system having cooling circuitry with a first coolant conduit for exchanging heat between a coolant and the first electric power device and a second coolant conduit for exchanging heat between the coolant and the second electric power device. The cooling system further includes flow control circuitry having a valve mechanism adjustable from an open state where the flow control circuitry connects the first coolant conduit to the second coolant conduit in a parallel-flow configuration, to a closed state where the flow control circuitry connects the first coolant conduit to the second coolant conduit in a series-flow configuration. The cooling system further includes refrigerant circuitry having a refrigerant conduit and an evaporative chiller. The evaporative chiller is in heat transference contact with the flow control circuitry at a location that is fluidly between the valve mechanism and each of the first coolant conduit and the second coolant conduit, such that the adjustment of the valve mechanism between the open state and the closed state thermally couples and thermally decouples, respectively, the cooling circuitry from the refrigerant circuitry.

In still another aspect, a method of operating a cooling system in a machine includes conveying coolant through cooling circuitry in the cooling system to exchange heat with a plurality of thermal loads in the machine, and adjusting a valve mechanism in the cooling system from a closed state to an open state, such that a flow of the coolant transitions from a series pattern through the cooling circuitry to a parallel pattern through the cooling circuitry. The method further includes thermally coupling refrigerant circuitry with the cooling circuitry by way of the flow of the coolant in the parallel pattern through the cooling circuitry.

DETAILED DESCRIPTION

Figure 1:
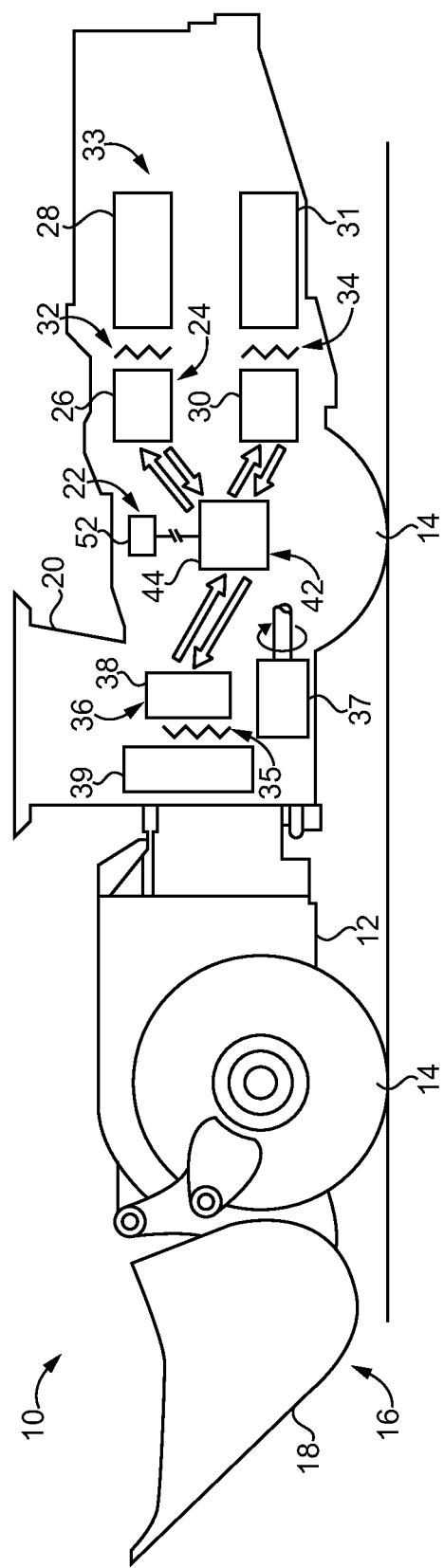
FIG. 1 is a side diagrammatic view of a machine, according to one embodiment.

Referring to FIG. 1, there is shown a machine 10 according to one embodiment, and including a machine frame 12 and a set of front ground-engaging elements 14 and back ground-engaging elements 14 coupled to machine frame 12. In the illustrated embodiment, machine 10 further includes a ground-engaging hydraulically-actuated implement system 16 having a bucket 18. Machine frame 12 may have an articulated configuration. An operator cab 20 is mounted to machine frame 12. It should be appreciated, however, that the depiction of machine 10 in FIG. 1 is illustrative only, and embodiments are contemplated where machine 10 includes a tracked machine, a machine other than configured for material handling or the like, or potentially a stationary machine that is not equipped with ground-engaging propulsion elements at all. It is nevertheless contemplated that a practical implementation of the present disclosure is in the field of underground mining, where machine 10 is used to capture, lift, and dump loose material such as ore and transport the material from a retrieval location to another location for transport or processing. To such ends, machine 10 may have a relatively low profile, and be otherwise equipped for operating in underground environments. Those skilled in the art will appreciate that certain underground environments may be associated with relatively extreme temperatures and/or relatively extreme changes in temperature over the course of a machine duty cycle. Coupled with the temperature control requirements among the various systems and subsystems of machine 10, cooling on-board equipment and different regions of machine 10 generally such as operator cab 20, the need for robust yet flexible temperature control for optimally and efficiently operating machine 10 can be substantial.

To this end, machine 10 includes a temperature control system 22. Temperature control system (hereinafter "system 22") includes cooling circuitry 24 having a first coolant conduit 26 for exchanging heat between a coolant conveyed through cooling circuitry 24 and a first thermal load 28. Cooling circuitry 24 further includes a second coolant conduit 30 for exchanging heat between the coolant and a second thermal load 31. In an implementation, the coolant can be a conventional water-glycol blend, although water only, glycol mixed with another fluid, or glycol only, saline water, oil, or any other suitable heat exchange fluid could be used. Machine 10 may further include an electrical power system 33 of which first thermal load 28 and second thermal load 31 are parts. In an implementation, each of first thermal load 28 and second thermal load 31 includes an electric power device of electrical power system 33. As further discussed herein, thermal load 31 might include an electrical energy storage device such as a battery or a capacitor, whereas thermal load 28 can include power electronics including electrical circuitry, resistors, inverters, transformers, rectifiers, switches, or still other electric power equipment. Electrical power system 33 may further include an electric traction motor 37 structured to power ground-engaging elements 14. Electric traction motor 37 could itself be or include a thermal load whose temperature is controlled by way of conveying coolant through cooling circuitry 24. It will be appreciated that while temperature control in the nature of cooling is contemplated as an application of the present disclosure, in other instances system 22 can be used for heating, such as by way of conveying heated coolant in heat transference contact with equipment to be heated. For instance, during starting up machine 10 heated coolant could be circulated past a battery to bring the battery up to an operating temperature. Instead of electrical power equipment, in other instances mechanical power equipment, such as an engine or a transmission could be temperature controlled in the manner described herein. A first heat exchange interface 32 is coupled between first coolant conduit 26 and first thermal load 28, whereas another heat exchange interface 34 is coupled between second coolant conduit 30 and second thermal load 31. It will be appreciated that each of heat exchange interface 32 and heat exchange interface 34 may include a heat exchange surface exposed to the corresponding one of first coolant conduit 26 or second coolant conduit 30, and another heat exchange surface directly or indirectly contacting thermal load 28 or thermal load 31 as the case may be. It should also be appreciated that a primary surface heat exchanger or a secondary surface heat exchanger, could form the subject heat exchange interfaces contemplated herein.

System 22 further includes refrigerant circuitry 36 including a refrigerant conduit 38, and an evaporative chiller 40 fluidly connected with refrigerant conduit 36. Refrigerant circuitry 36 is coupled with another thermal load 39 by way of another heat exchange interface 35, also understood to include heat exchange surfaces analogous generally to interfaces 32 and 34. In an implementation, thermal load 39 includes operator cab 20 or equipment for cooling operator cab 20. Thermal load 39 will typically be cooled to a temperature less than an ambient temperature. At the same time thermal load 28 might be cooled, such as by way of a radiator, to a temperature that is no less than an ambient temperature. Thermal load 31 could be cooled to an ambient temperature, or below an ambient temperature by way of selectively connecting cooling circuitry 24 with refrigerant circuitry 36. Selective connection of cooling circuitry 24 in this manner can take place while simultaneously varying a pattern of coolant flow in a manner further described herein.

Figure 2:
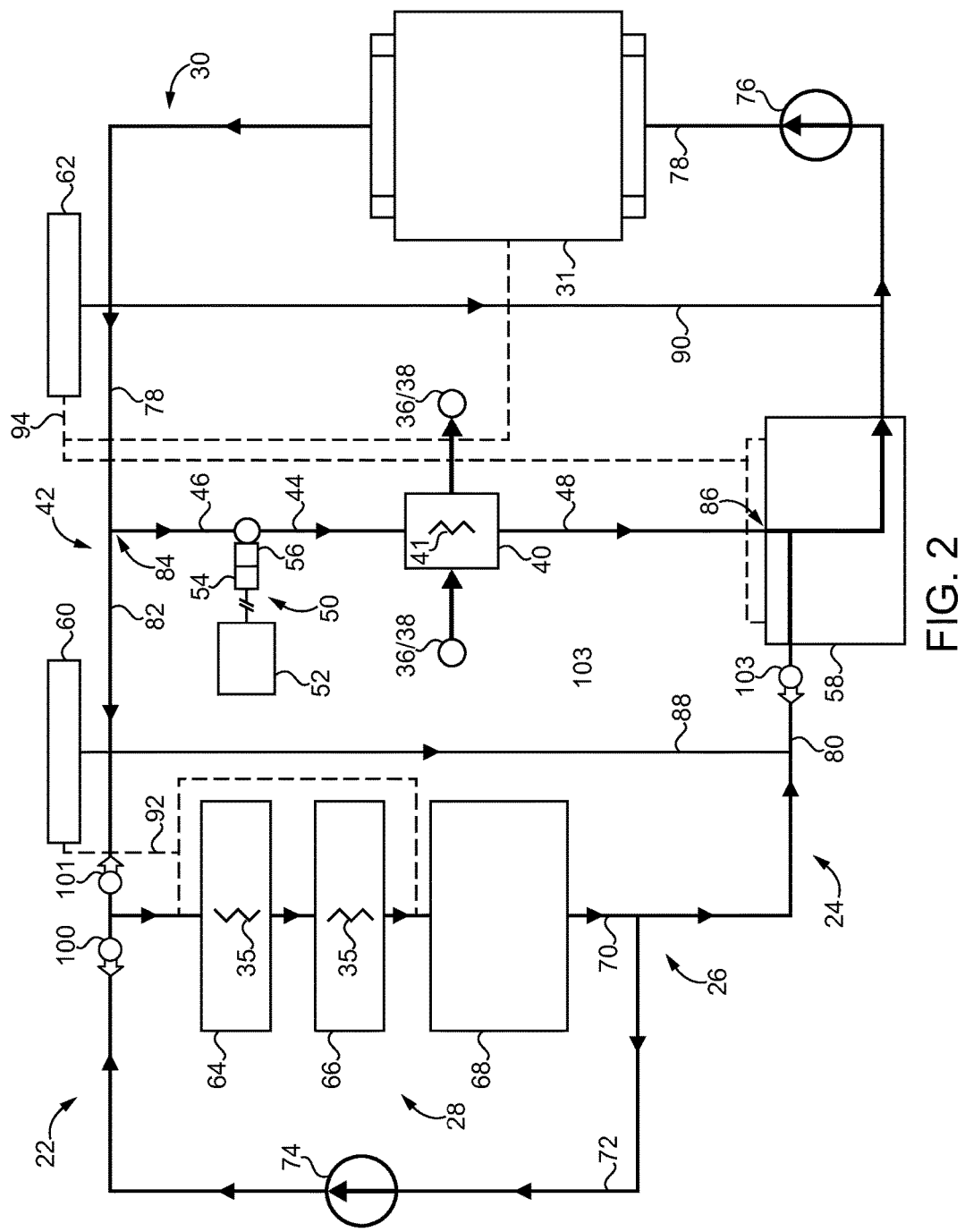
FIG. 2 is a schematic view of temperature control system for a machine, according to one embodiment.

System 22 further includes flow control circuitry 42 having a flow control conduit 44 in heat transference contact with evaporative chiller 40. Referring also to FIG. 2, flow control conduit 44 has an incoming segment 46 and an outgoing segment 48 each fluidly connected to both of first coolant conduit 26 and second coolant conduit 30. A valve mechanism 50 is positioned fluidly between incoming segment 46 and outgoing segment 48. In an implementation, valve mechanism 50 includes an electrical actuator 54 such as a solenoid coupled with a valve member 56, such as a poppet valve or a slide-type hydraulic valve. An electronic control unit 52, including any suitable processor such as a microprocessor or a field programmable gate array (FPGA), is in control communication with electrical actuator 54 to adjust valve mechanism 50 between a closed state at which incoming segment 46 is blocked from outgoing segment 48, such that flow control circuitry 42 connects first coolant conduit 26 and second coolant conduit 30 in series, and an open state. At the open state, incoming segment 46 is fluidly connected to outgoing segment 48 such that flow control circuitry 42 connects first coolant conduit 26, second coolant conduit 30, and flow control conduit 44 in parallel.

In the FIG. 2 illustration it can be seen that flow control circuitry 42 fluidly connects first coolant conduit 26 to second coolant conduit 30 according to the same connection pattern at each of the open state and the closed state of valve mechanism 50. As noted, valve mechanism 50 may include a two-position electrically actuated shutoff valve, however, in other embodiments a valve connecting more than two passages, a valve assembly of multiple valves, or still another valve configuration might be employed to various ends. It can also be seen from FIG. 2 that second coolant conduit 30 includes a pump 76 positioned therein and structured to convey coolant through second coolant conduit 30 by way of a heat exchange conduit 78. For purposes of an understanding of the present disclosure, the term "conduit" can be understood to include a single passage such as a pipe, hose, line, as well as multiple parallel fluid conveyance passages structured to convey a fluid in parallel from a common inlet location to a common outlet location. Flow control circuitry 42 further includes an inlet 84 to incoming segment 46, and an outlet 86 from outgoing segment 48. A connecting conduit 82 of flow control circuitry 42 intersects with heat exchange conduit 78 at a junction common to connecting conduit 82, heat exchange conduit 78, and incoming segment 46 in the illustrated embodiment.

System 22 further includes a coolant reserve tank 58, which may be configured such that outgoing segment 48 is connected to each of first coolant conduit 26 and second coolant conduit 30 by way of coolant reserve tank 58. In one implementation, coolant reserve tank 58 may be unobstructed such that coolant conveyed through first coolant conduit 26 mixes uninhibited with coolant conveyed through second coolant conduit 30 within coolant reserve tank 58, although the present disclosure is not thereby limited.

System 22 further includes a first header tank 60, and a feed line 88 extending between first header tank 60 and connecting conduit 80. A vent line 92 extends between heat exchange conduit 70 and first header tank 60. System 22 also includes a second header tank 62, and a feed line 90 extending between second header tank 62 and heat exchange conduit 78, and a vent line or a plurality of vent lines 94 extending between heat exchange conduit 78 and second header tank 62 and between coolant reserve tank 58 and second header tank 62.

Also shown in FIG. 2 is heat exchange interface 35 shown in heat transference contact with power electronics 64 and power electronics 66 which together comprise thermal load 28. It will be recalled that heat exchange interface 35 and others discussed herein will include a heat exchange surface exposed to a flow of coolant conveyed through first coolant conduit 26, and another heat exchange surface in heat transference contact with thermal load 28 or a part thereof. Also disposed within first coolant conduit 26 is a radiator 68. It will be recalled that system 22 may be configured such that certain components whose temperature is controlled are cooled to a temperature not less than an ambient temperature. To this end, radiator 68 could be an air-cooled radiator through which coolant is conveyed.

First coolant conduit 26 also may include a pumping conduit 72 and a pump 74 within pumping conduit 72 that are each positioned in parallel with heat exchange interfaces/surface 35 and structured to convey coolant through first coolant conduit 26. Those skilled in the art will further appreciate that additional thermal loads might be temperature controlled according to the present disclosure, with a plurality of heat exchange surfaces structured to exchange heat with the plurality of thermal loads generally in a manner as illustrated in FIG. 2, with no limit on the number of thermal loads whose temperature can be controlled. It will further be observed from FIG. 2 that a plurality of different check valves are provided, including a first check valve 100 positioned between pumping conduit 72 and heat exchange conduit 70, a second check valve 101 positioned between connecting conduit 82 and heat exchange conduit 70, and a third check valve 103 positioned between connecting conduit 80 and coolant reserve tank 58.

It will be recalled that flow control conduit 44 is in heat transference contact with evaporative chiller 40. Valve mechanism 50 is adjustable from an open state where flow control circuitry 42 connects first coolant conduit 26 and second coolant conduit 30 in a parallel-flow configuration, to a closed state where flow control circuitry 42 connects first coolant conduit 26 and second coolant conduit 30 in a series-flow configuration. From FIG. 2 and the directional flow arrows depicted, it will be understood that coolant flow proceeds through heat exchange conduit 78, which is part of second coolant conduit 30, through flow control conduit 44, and through heat exchange conduit 70, which is part of first coolant conduit 26, in parallel when valve mechanism 40 fluidly connects incoming segment 46 to outgoing segment 48. In the open configuration of valve mechanism 50, heat exchange conduit 78 is fluidly connected to connecting conduit 82 and connecting conduit 80 is fluidly connected to heat exchange conduit 78. In the closed state of valve mechanism 50 the same fluid connections exist, but with a different degree of flow given that flow control conduit 44 is blocked. With valve mechanism 50 open, the coolant conveyed through flow control conduit 44 can exchange heat with refrigerant conveyed through refrigerant circuitry 36 and refrigerant conduit 38 by way of evaporative chiller 40. As a result, coolant conveyed through second coolant conduit 30 can be chilled to a temperature below an ambient temperature. Meanwhile, refrigerant conveyed through refrigerant circuitry 36 can cool yet another part of machine 10 or equipment of machine 10 to a temperature below ambient. In an implementation, thermal load 39 can include operator cab 20 or parts of an air conditioning system for operator cab 20.

Figure 3:
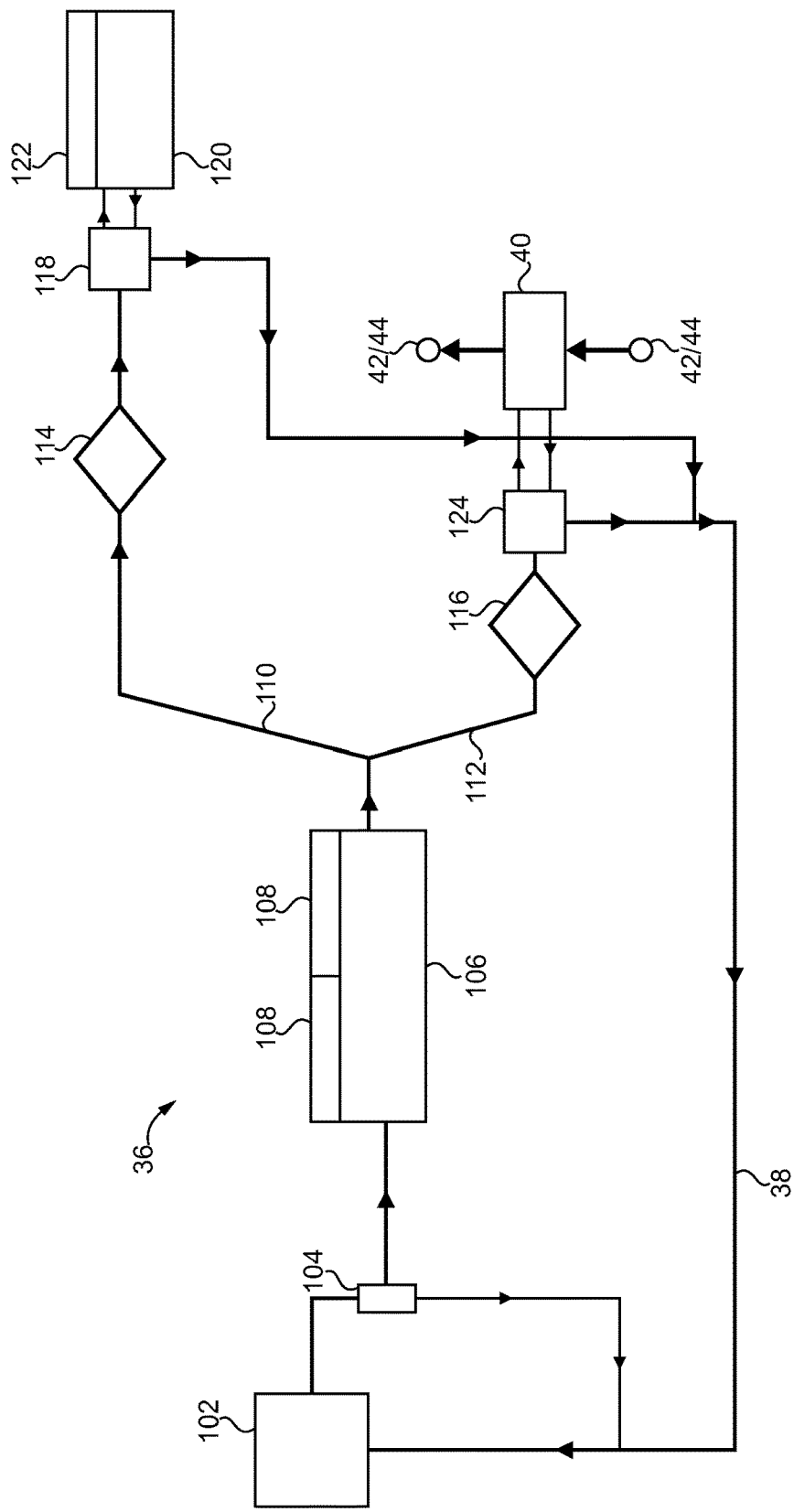
FIG. 3 is a schematic view of a portion of the temperature control system of FIG. 2.

Referring also now to FIG. 3, there are shown additional features of refrigerant circuitry 36. It can be noted that evaporative chiller 40 is also shown in FIG. 3, coupled with flow control circuitry 42 and flow control conduit 44. In an implementation, refrigerant circuitry 36 includes a compressor 102, structured to compress refrigerant in a generally conventional manner, and a filter 104 structured to remove oil or the like from refrigerant circuitry 36. Refrigerant conveyed past filter 104 can be conveyed to a condenser 106 equipped with one or more fans 108. A branch passage 110 for refrigerant and a second branch passage 112 for refrigerant extend in parallel from condenser 106 to evaporative chiller 40, and also to a second evaporative chiller 120 coupled with a blower 122. A solenoid operated shutoff valve 114 and a second solenoid operated shutoff valve 116 may be positioned fluidly within branch passage 110 and branch passage 112, respectively. A valve 118 may be positioned fluidly between valve 114 and evaporative chiller 120, and another valve 124 may be positioned fluidly between valve 116 and evaporative chiller 40. Each of valves 118 and 124 can be operated to selectively connect the flow of compressed and condensed refrigerant to the corresponding evaporative chiller 40 or 120, or instead bypass the corresponding evaporative chiller 40 or 120, and return to compressor 102. Blower 122 can include a blower in an air conditioning system for cooling operator cab 20.

INDUSTRIAL APPLICABILITY

As discussed above, machine 10 and other machines contemplated within the scope of the present disclosure can operate in thermally dynamic environments or conditions and/or in environments with temperature extremes. It may be desirable or critical to cool operator cab 20 for operator comfort and working efficiency, while also cooling thermal load 31 and thermal load 28. Depending upon the cooling requirements, it may be desirable at least periodically to not only cool the operator environment, but also cool thermal load 31 and potentially also thermal load 28 to a relative extent greater than what can be realized by way of radiator 68 alone.

During typical operation of system 22, coolant may be conveyed through cooling circuitry 24 to exchange heat with a plurality of thermal loads in machine 10. With valve mechanism 50 closed, pump 76, and potentially also pump 74, can be operated to circulate coolant from reserve tank 58 through or past thermal load 31 to exchange heat therewith, and thenceforth through conduit 78 and conduit 82, past check valve 101, and through conduit 70 to exchange heat with thermal load 28. Radiator 68 enables exchange of heat between the coolant having exchanged heat with a plurality of thermal loads, and ambient air, for example. Meanwhile, refrigerant circuitry 36 conveys refrigerant through refrigerant conduit 38 and through evaporative chiller 120 to cool operator cab 20 as needed. Compressor 102 might be operated continuously, or only on an as-needed basis, depending upon cooling requirements. Valves 118 and 124 (or other valves) can be operated to direct refrigerant to a selected one or both of evaporative chillers 40 and 120.

When cooling requirements or desired cooling efficacy changes, valve mechanism 50 may be adjusted from its closed state to an open state, such that a flow of the coolant transitions from a series pattern through cooling circuitry 24 to a parallel pattern through cooling circuitry 24. With valve mechanism 50 adjusted to its open state, incoming segment 46 is fluidly connected to outgoing segment 48 such that coolant flows through evaporative chiller 40. Compressor 102 may be turned on, or may already be on, such that refrigerant chills coolant in evaporative chiller 40. Coolant temperature throughout temperature control system 22 can be reduced, or otherwise modulated or prevented from changing, by way of the exchange of heat between coolant and refrigerant. The process can be effective generally in reverse where it is no longer desired to thermally couple refrigerant circuitry 36 with cooling circuitry 24 by adjusting valve mechanism 50 to its closed state.

It will be appreciated that thermally coupling refrigerant circuitry 36 with cooling circuitry 24 initiates a flow of coolant in contact with a heat exchange surface 41 of evaporative chiller 40. In other words, with valve mechanism 50 closed, coolant within evaporative chiller 40 may be quiescent and not flowing or at least not actively exchanging heat with refrigerant circuitry 36 or refrigerant therein. This strategy differs from known techniques where refrigerant circuitry is always thermally coupled with coolant circuitry, providing for certain advantages with respect to system flexibility and efficiency relative to certain applications, as cooling can be controlled not only by switching on or off a compressor but by way of adjusting valve position.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A temperature control system for a machine comprising:
    cooling circuitry including a first coolant conduit for exchanging heat between a coolant conveyed through the cooling circuitry and a first thermal load, and a second coolant conduit for exchanging heat between the coolant and a second thermal load;
    refrigerant circuitry including a refrigerant conduit, and an evaporative chiller fluidly connected with the refrigerant conduit;
    flow control circuitry including a flow control conduit in heat transference contact with the evaporative chiller, the flow control conduit having an incoming segment and an outgoing segment each fluidly connected to both of the first coolant conduit and the second coolant conduit, and a valve mechanism;
    the valve mechanism being positioned fluidly between the incoming segment and the outgoing segment, and adjustable between a closed state at which the incoming segment is blocked from the outgoing segment such that the flow control circuitry connects the first coolant conduit and the second coolant conduit in series, and an open state at which the incoming segment is fluidly connected to the outgoing segment such that the flow control circuitry connects the first coolant conduit, the second coolant conduit, and the flow control conduit in parallel.

2. The system of claim 1 wherein the flow control circuitry fluidly connects the first coolant conduit to the second fluid conduit according to the same connection pattern at each of the open state and the closed state of the valve mechanism.

3. The system of claim 2 wherein the valve mechanism includes an electrically actuated shutoff valve.

4. The system of claim 1 further comprising a coolant reserve tank, and the outgoing segment being connected to each of the first coolant conduit and the second coolant conduit by way of the coolant reserve tank.

5. The system of claim 4 wherein the evaporative chiller is in heat transference contact with the outgoing segment.

6. The system of claim 1 further comprising a heat exchange surface exposed to a flow of coolant conveyed through the first coolant conduit and structured to exchange heat with the first thermal load, and a pump in parallel with the heat exchange surface and structured to convey the coolant through the first coolant conduit.

7. The system of claim 6 further comprising a radiator within the first coolant conduit, and wherein the heat exchange surface is one of a plurality of heat exchange surfaces structured to exchange heat with a plurality of thermal loads.

8. The system of claim 6 further comprising a second heat exchange surface exposed to a flow of coolant conveyed through the second coolant conduit, and a second pump in series with the second heat exchange surface.

9. The system of claim 1 further comprising a compressor, a condenser, and a second evaporative chiller each within the refrigerant conduit.

10. The system of claim 9 further comprising a first flow control valve and a second flow control valve positioned fluidly between the condenser and the first evaporative chiller and the second evaporative chiller, respectively.

11. A machine comprising:
    a frame;
    an electrical power system including a first electric power device and a second electric power device;

a cooling system including cooling circuitry having a first coolant conduit for exchanging heat between a coolant and the first electric power device and a second coolant conduit for exchanging heat between the coolant and the second electric power device;

the cooling system further including flow control circuitry having a valve mechanism adjustable from an open state where the flow control circuitry connects the first coolant conduit to the second coolant conduit in a parallel-flow configuration, to a closed state where the flow control circuitry connects the first coolant conduit to the second coolant conduit in a series-flow configuration; and the cooling system further including refrigerant circuitry having a refrigerant conduit and an evaporative chiller, the evaporative chiller being in heat transference contact with the flow control circuitry at a location that is fluidly between the valve mechanism and each of the first coolant conduit and the second coolant conduit, such that the adjustment of the valve mechanism between the open state and the closed state thermally couples and thermally decouples, respectively, the cooling circuitry from the refrigerant circuitry.

12. The machine of claim 11 further comprising an operator cabin mounted to the frame, and wherein the refrigerant circuitry further includes a second evaporative chiller and a blower coupled with the second evaporative chiller to produce chilled air for cooling the operator cabin.

13. The machine of claim 12 further comprising a radiator and a first pump within the first coolant conduit, and a second pump within the second coolant conduit.

14. The machine of claim 13 wherein the first pump is in parallel with the radiator.

15. The machine of claim 14 wherein the common reserve tank forms a flow-through segment of the cooling circuitry in each of the parallel-flow configuration and the series-flow configuration.

16. The machine of claim 15 further comprising ground-engaging propulsion elements and a ground-engaging implement system each coupled with the frame, and wherein at least one of the first electric power device or the second electric power device includes an electrical energy storage device, and the electric power system further includes an electric propulsion motor coupled with the ground-engaging propulsion elements.

17. The machine of claim 11 further comprising a common reserve tank, and wherein the first coolant conduit and the second coolant conduit are fluidly connected by way of the common reserve tank.

18. A method of operating a cooling system in a machine comprising:

conveying coolant through cooling circuitry in the cooling system to exchange heat with a plurality of thermal loads in the machine;

adjusting a valve mechanism in the cooling system from a closed state to an open state, such that a flow of the coolant transitions from a series pattern through the cooling circuitry to a parallel pattern through the cooling circuitry; and thermally coupling refrigerant circuitry with the cooling circuitry by way of the flow of the coolant in the parallel pattern through the cooling circuitry.

19. The method of claim 18 wherein thermally coupling the refrigerant circuitry with the cooling circuitry further includes initiating a flow of the coolant in contact with a heat exchange surface of an evaporative chiller.

20. The method of claim 19 further comprising cooling one of the plurality of thermal loads to a temperature less than an ambient temperature by way of the thermally coupling of the refrigerant circuitry with the cooling circuitry.

\* \* \* \* \*